United States Patent
Tsai

(10) Patent No.: US 7,353,069 B2
(45) Date of Patent: Apr. 1, 2008

(54) ELECTRONIC APPARATUS CAPABLE OF ADJUSTING DISPLAY DIRECTION AND DISPLAY-DIRECTION ADJUSTING METHOD THEREOF

(75) Inventor: Hsin-Feng Tsai, Pao Chiao (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/377,395

(22) Filed: Mar. 17, 2006

(65) Prior Publication Data
US 2007/0032886 A1 Feb. 8, 2007

(30) Foreign Application Priority Data
Aug. 2, 2005 (TW) .............. 94126279 A

(51) Int. Cl.
G05B 11/01 (2006.01)
G05B 15/00 (2006.01)
G06F 3/038 (2006.01)
G09G 5/00 (2006.01)

(52) U.S. Cl. .............. 700/17; 700/83; 345/649; 345/204; 345/656; 345/658

(58) Field of Classification Search .............. 345/158, 345/204, 649, 656, 658; 700/17, 83
See application file for complete search history.

(56) References Cited

U.S. PATENT DOCUMENTS

| | | | |
|---|---|---|---|
| 6,084,594 A * | 7/2000 | Goto | 345/427 |
| 6,545,661 B1 * | 4/2003 | Goschy et al. | 345/158 |
| 6,597,384 B1 * | 7/2003 | Harrison | 345/204 |
| 7,170,534 B2 * | 1/2007 | Son et al. | 345/659 |
| 7,181,251 B2 * | 2/2007 | Stohr et al. | 455/566 |
| 2003/0085870 A1 * | 5/2003 | Hinckley | 345/156 |
| 2004/0150635 A1 * | 8/2004 | Clapper | 345/204 |
| 2005/0206736 A1 * | 9/2005 | Ng et al. | 348/208.7 |
| 2005/0231474 A1 * | 10/2005 | Su et al. | 345/158 |
| 2006/0033760 A1 * | 2/2006 | Koh | 345/649 |
| 2006/0187203 A1 * | 8/2006 | Piraneque et al. | 345/158 |
| 2007/0046630 A1 * | 3/2007 | Hong et al. | 345/158 |

FOREIGN PATENT DOCUMENTS

CN 1296215 A 5/2001

\* cited by examiner

Primary Examiner—Ronald Hartman, Jr.
(74) Attorney, Agent, or Firm—Rabin & Berdo, P.C.

(57) ABSTRACT

An electronic apparatus capable of adjusting display direction and display-direction adjusting method thereof are disclosed. The electronic apparatus includes a sensing unit, a processing unit, and a display unit. The sensing unit is for outputting a sensing signal according to a placement status of the electronic apparatus. The processing unit is for generating a control signal according to the sensing signal. The display unit is for adjusting display direction under the control of the control signal.

27 Claims, 9 Drawing Sheets

100

100

| | The included angle between the ground and the electroinc apparatus | X | Y |
|---|---|---|---|
| The first landscape status (X1, Y1) | 0 | 121 | 121 |
| | 45 | 121 | 160 |
| | 90 | 121 | 184 |
| The first portrait status (X2, Y2) | 0 | 121 | 121 |
| | 45 | 85 | 121 |
| | 90 | 58 | 121 |
| The second landscape status (X3, Y3) | 0 | 121 | 121 |
| | 45 | 121 | 90 |
| | 90 | 121 | 58 |
| The second portrait status (X4, Y4) | 0 | 121 | 121 |
| | 45 | 160 | 121 |
| | 90 | 184 | 121 |

FIG. 7

ELECTRONIC APPARATUS CAPABLE OF ADJUSTING DISPLAY DIRECTION AND DISPLAY-DIRECTION ADJUSTING METHOD THEREOF This application claims the benefit of Taiwan application Serial No. 94126279, filed Aug. 2, 2005, the subject matter of which is incorporated herein by reference.

BACKGROUND OF THE INVENTION

1. Field of the Invention

The invention relates in general to an electronic apparatus, and more particularly to an electronic apparatus capable of adjusting display direction and a display-direction adjusting method thereof.

2. Description of the Related Art

Along with information technology developments, nowadays, for those who have to work in different places, storing mass information into an electronic apparatus for processing as needed has become an essential tendency. Electronic apparatuses, such as tablet personal computers, and personal digital assistants (PDA), are increasingly widespread because they are easy to carry, thin and small.

In order to meet various requirements, the tablet personal computer may be placed in a landscape status or a portrait status according to the requirement of the user. For example, the tablet personal computer as placed in a landscape status can normally have a better display effect. However, when the user uses the tablet personal computer in a handwriting way, the tablet personal computer can be more convenient when used in a portrait status.

Referring to FIG. 1A and FIG. 1B, a schematic diagram of a tablet personal computer placed in a landscape status and a schematic diagram of a tablet personal computer placed in a portrait status are respectively shown. Suppose that the user can observe a picture on the landscape-status tablet personal computer 100 (as shown in FIG. 1A) at a certain observation position. When the tablet personal computer 100 is changed from the landscape status to a portrait status (as shown in FIG. 1B), the display picture accordingly rotates its display direction clockwise by 90 degrees. If the user does not adjust his/her observation position, he/she will not observe the correct image, thereby making the tablet personal computer inconvenient to use.

SUMMARY OF THE INVENTION

It is therefore an object of the invention to provide an electronic apparatus capable of adjusting display direction and display-direction adjusting method thereof. The electronic apparatus can automatically adjust the display direction of image frames according to its placement status (orientation). Therefore, no matter what orientation the electronic apparatus is rotated to, the user can see the correct image frame without changing his/her observation position.

The invention achieves the above-identified object by providing an electronic apparatus capable of adjusting display direction. The electronic apparatus includes a sensing unit, a processing unit, and a display unit. The sensing unit is for outputting a sensing signal according to a placement status of the electronic apparatus. The processing unit is for generating a control signal according to the sensing signal. The display unit is for adjusting display direction under the control of the control signal.

The invention achieves the above-identified object by providing a display-direction adjusting method, applied to an electronic apparatus. The electronic apparatus includes a sensing unit, a processing unit and a display unit. First, determine the placement status of the electronic apparatus by the sensing unit. Following that, output a sensing signal to the processing unit according to the placement status of the electronic apparatus. Next, generate a control signal according to the sensing signal by the processing unit. Finally, adjust the display direction of the display unit according to the control signal.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 7 is a look-up table of the electronic apparatus.

DETAILED DESCRIPTION OF THE INVENTION

Embodiment One

Figure 1A:
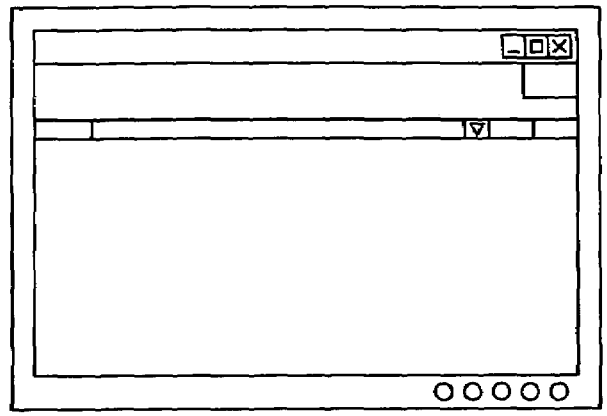
FIG. 1A (Prior Art) is a schematic diagram of a tablet personal computer placed in a landscape status.
Figure 1B:
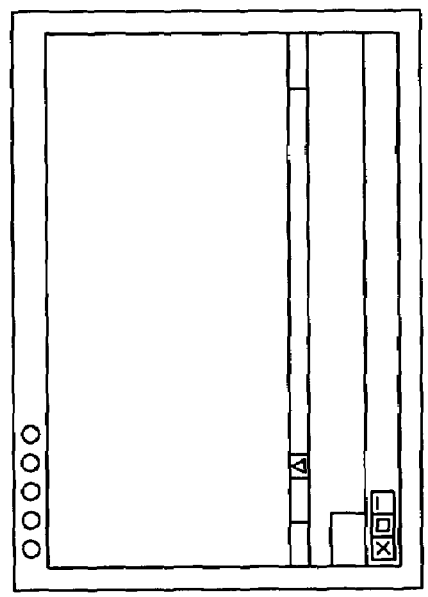
FIG. 1B (Prior Art) is a schematic diagram of a tablet personal computer placed in a portrait status.
Figure 2:
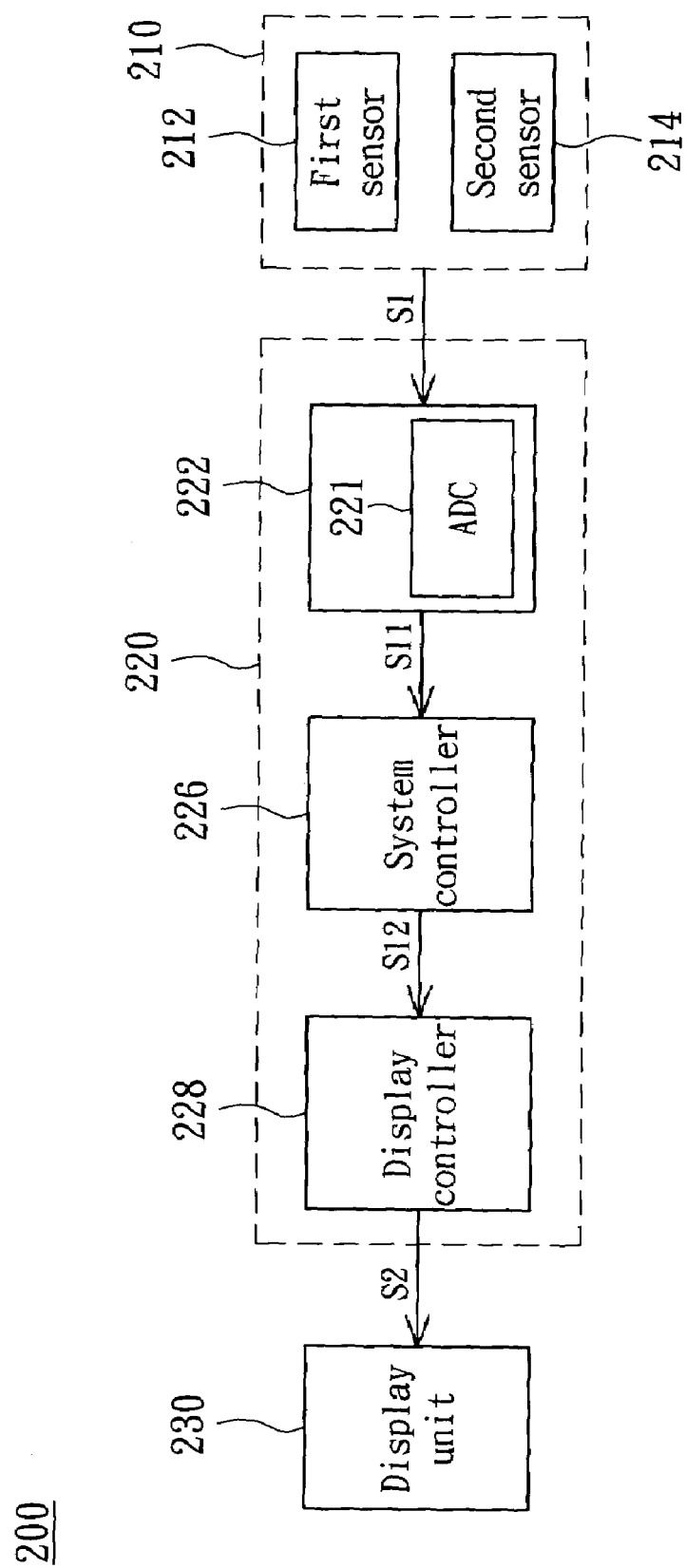
FIG. 2 is a block diagram of an electronic apparatus capable of adjusting display direction according to a first embodiment of the invention.

Referring to FIG. 2, a block diagram of an electronic apparatus capable of adjusting display direction according to a first embodiment of the invention is shown. The electronic apparatus 200, such as a tablet personal computer, a PDA, or a liquid crystal display (LCD), includes a sensing unit 210, a processing unit 220 and a display unit 230. The sensing unit 210 outputs a sensing signal S1 according to the placement status of the electronic apparatus 200. The processing unit 220 generates a control signal S2 according to the sensing signal S1, and the processing unit 220 adjusts the display direction of the display unit 230 under the control of the control signal S2.

Furthermore, the sensing unit 210, such as an accelerometer, includes a first sensor 212 and a second sensor 214. The first sensor 212 is for sensing the magnitude of a first force applied to the electronic apparatus 200 in a first direction, such as the x-axis direction in a 3-D coordinate space. The second sensor 214 is for sensing the magnitude of a second force applied to the electronic apparatus 200 in a second direction, such as the y-axis direction defined in the 3-D coordinate space, and the second direction is vertical to the first direction. The sensing unit 210 outputs the sensing signal S1 according to the magnitude of the first and the second forces.

The processing unit 220 includes a peripheral controller 222, system controller 226 and a display controller 228. If the sensing unit 210 is an analog device, such as an analog accelerometer, the outputted sensing signal S1 is an analog signal and the peripheral controller 222 further includes an analog to digital converter (ADC) 221, for converting the sensing signal S1 into a digital signal. If the sensing unit 210 is a digital device, such as a digital accelerometer, the outputted sensing signal S1 is a digital signal and thus the sensing signal S1 can be sent directly to the peripheral controller 222. The peripheral controller 222 outputs a first signal S11 according to the digital signal and the system controller 226 outputs a driving signal S12 by inquiring a look-up table or a predetermined relationship table according to the first signal S11. The display controller 228 outputs a control signal S2 to control the display direction of the display unit 230 according to the driving signal S12.

The display unit 230 adjusts its display direction according to the placement status of the electronic apparatus 200. The placement status of the electronic apparatus 200 can be defined to include a first landscape status, a second landscape status, a first portrait status, and a second portrait status. The electronic apparatus 200 can output different sensing signals S1 as parameters of the look-up table for display direction adjustment according to the inclination degrees of the electronic apparatus 200 in the four above-mentioned placement statuses relative to a parallel plane. However, the look-up table needs not to be set up in the electronic apparatus 200.

Figure 3A:
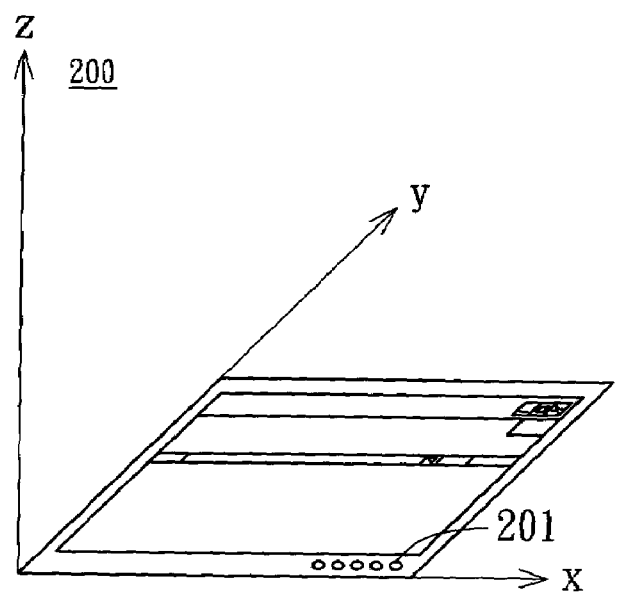
FIG. 3A and FIG. 3B are schematic diagrams of the electronic apparatus placed in the first landscape status.
Figure 3B:
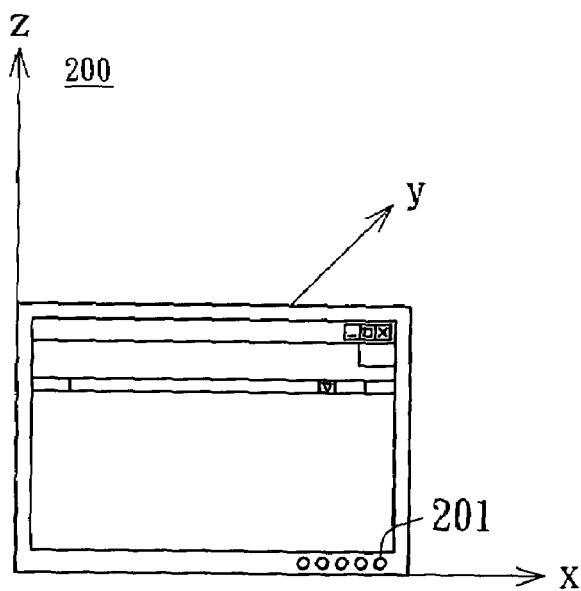

Referring to FIG. 3A and FIG. 3B at the same time, schematic diagrams of the electronic apparatus 200 placed in the first landscape status are shown. The x-y plane of the 3-D coordinate space is defined as the parallel plane mentioned above. In order to understand the first landscape status, the second landscape status, the first portrait status, and the second portrait status of the electronic apparatus 200 more easily, the electronic apparatus 200 is defined to have a key 201, and the placement status of the electronic apparatus 200 can be obtained according to the position of the key 201. When the electronic apparatus 200 is in a first landscape status, the key 201 is located at the right-bottom corner of the display frame of the electronic apparatus 200. While the electronic apparatus 200 is in the first landscape status, the electronic apparatus 200 is lay down on the x-y plane (as shown in FIG. 3A) and can be rotated to the x-z plane (as shown in FIG. 3B) vertical to the x-y plane along the x-axis. The rotation angles of the electronic apparatus 200 as rotated along the x-axis lie between 0~90 degrees. FIG. 3A represents the included angle between the electronic apparatus 200 and the x-y plane is 0 while FIG. 3B shows the included angle between the electronic apparatus 200 and the x-y plane is 90 degrees. The first sensor 212 senses the magnitude of the first force applied to the electronic apparatus 200 in the x-direction and generates data X1 accordingly. In the meanwhile, the second sensor 214 senses the magnitude of the second force applied to the electronic apparatus 200 in the y-direction and generates data Y1 accordingly.

Figure 4A:
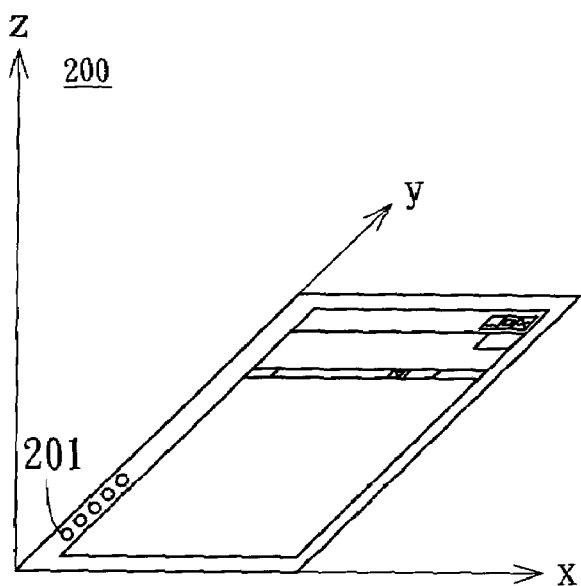
FIG. 4A and FIG. 4B are schematic diagrams of the electronic apparatus placed in the first portrait status.
Figure 4B:
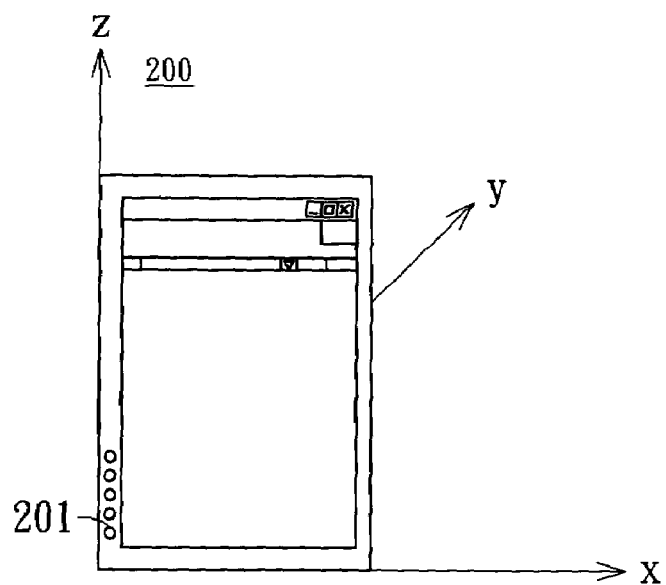

Referring to FIG. 4A and FIG. 4B at the same time, schematic diagrams of the electronic apparatus 200 placed in the first portrait status are shown. When the user rotates the electronic apparatus 200 clockwise by 90 degrees along the z-axis from the first landscape status, the electronic apparatus 200 is placed in the first portrait status, and the key 201 of the electronic apparatus 200 is located at the left-bottom corner of the display frame. Then, the electronic apparatus 200 in the first portrait status and originally lay down on the x-y plane (as shown in FIG. 4A) can be rotated along the x-axis to the x-z plane (as shown in FIG. 4B) vertical to the ground. The rotation angles of the electronic apparatus 200 along the x-axis lie between 0~90. FIG. 4A represents the included angle between the electronic apparatus 200 and the x-y plane is 0 while the FIG. 4B shows the included angle between the electronic apparatus 200 and the x-y plane is 90 degree. The first sensor 212 senses the magnitude of the first force applied to the electronic apparatus 299 in the x-direction and generates the data X2 accordingly. In the meanwhile, the second sensor 214 senses the magnitude of the second forces applied to the electronic apparatus 200 in the y-direction and generates the data Y2.

Figure 5A:
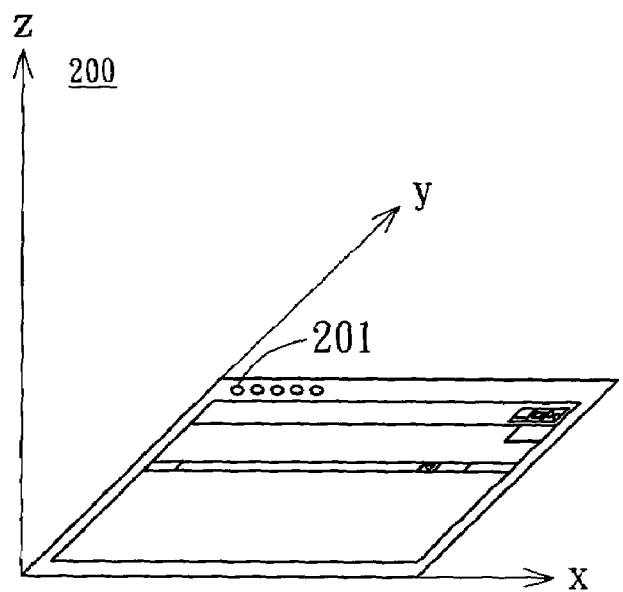
FIG. 5A and FIG. 5B are schematic diagrams of the electronic apparatus placed in the second landscape status.
Figure 5B:
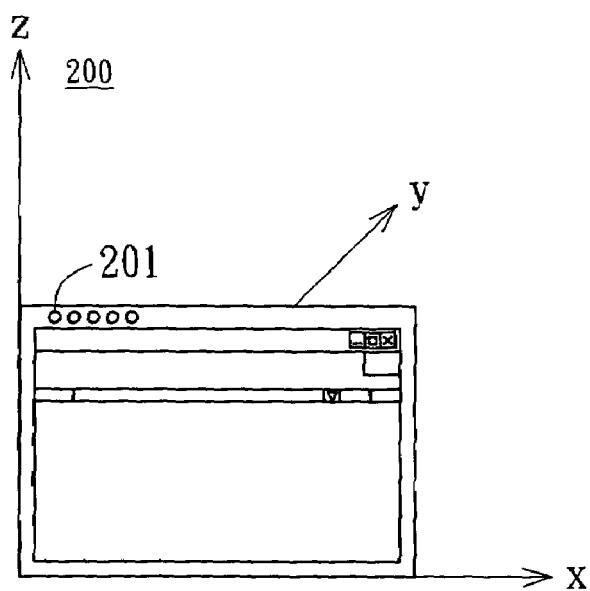

Referring to FIG. 5A and FIG. 5B at the same time, schematic diagrams of the electronic apparatus 200 placed in the second landscape status are shown. When the user rotates the electronic apparatus 200 in the first portrait status clockwise by 90 degrees along the z-axis, the electronic apparatus 200 is set in the second landscape status, and the key 201 of the electronic apparatus 200 is located at the left-top corner of the display frame. The electronic apparatus 200 in the second landscape status can be rotated along the x-axis from the x-y plane it lies on (as shown in FIG. 5A) to the x-z plane (as shown in FIG. 5B) vertical to the ground. The rotation angles of the electronic apparatus 200 along the x-axis lie between 0~90 degrees. FIG. 5A represents the included angle between the electronic apparatus 200 and the x-y plane is 0 while FIG. 5B shows the included angle between the electronic apparatus 200 and the x-y plane is 90 degrees. The first sensor 212 senses the magnitude of the first force applied to the electronic apparatus 200 in the x-direction and generates data X3 accordingly in the meanwhile the second sensor 214 senses the magnitude of the second force applied to the electronic apparatus 200 in the y-direction and generates data Y3 accordingly.

Figure 6A:
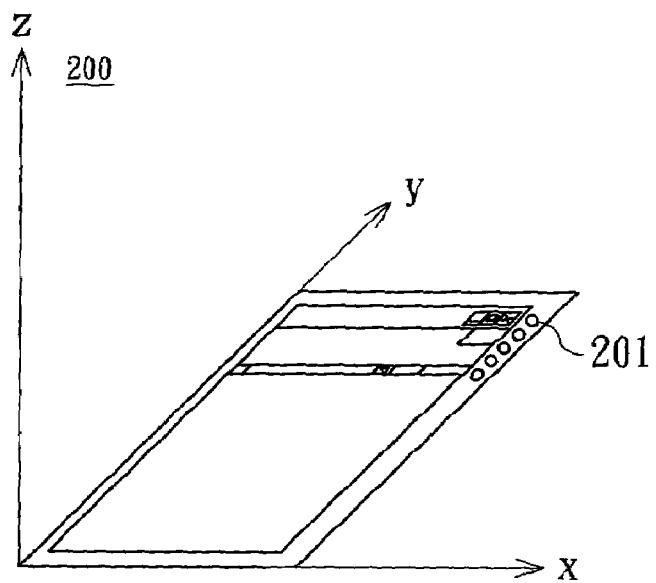
FIG. 6A and FIG. 6B are schematic diagrams of the electronic apparatus placed in the second portrait status.
Figure 6B:
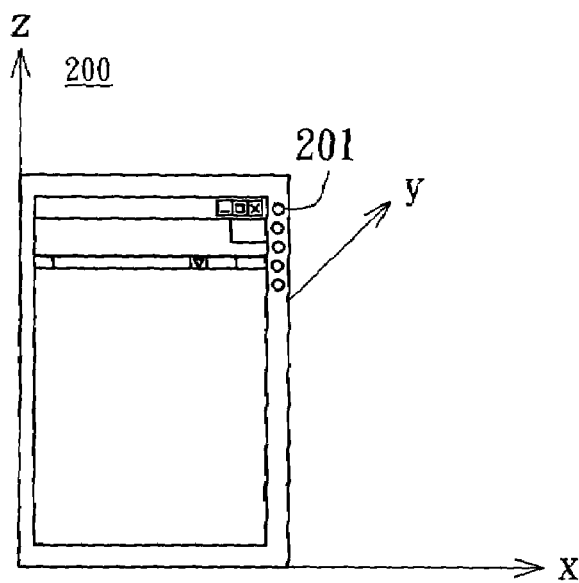

Referring to FIG. 6A and FIG. 6B at the same time, schematic diagrams of the electronic apparatus 200 placed in the second portrait status are shown. When the user rotates the electronic apparatus 200 in the second landscape status clockwise by 90 degrees along the z-axis, the electronic apparatus 200 is set in the second portrait status, and the key 201 of the electronic apparatus 200 is located at the right-top corner of the display frame. The electronic apparatus 200 in the second portrait status can be rotated along the x-axis from the x-y plane it lies on (as shown in FIG. 6A) to the x-z plane (as shown in FIG. 6B) vertical to the ground. The rotation angles of the electronic apparatus 200 along the x-axis lie between 0~90 degrees. FIG. 6A represents the included angle between the electronic apparatus 200 and the x-y plane is 0 while FIG. 6B shows the included angle between the electronic apparatus 200 and the x-y plane is 90 degrees. The first sensor 212 senses the magnitude of the first force applied to the electronic apparatus 200 in the x-direction and generates data X4 accordingly in the meanwhile the second sensor 214 senses the magnitude of the second force applied to the electronic apparatus 200 in the y-direction and generates data Y4 accordingly.

From FIGS. 3A, 3B, 4A, 4B, 5A, 5B, 6A, 6B mentioned above, it can be seen that no matter what placement status the electronic apparatus 200 is situated in, the electronic apparatus 200 can automatically adjust its display direction. Under the different placement statuses of the electronic apparatus 200, the data generated by the first sensor 212 and the second sensor 214 have correspondence parameters in the electronic apparatus 200, and the placement status of the electronic apparatus 200 can be obtained according to the correspondence parameters and thus the display direction can be adjusted. There are two methods for obtaining the correspondence parameters. In one method, the placement status of the electronic apparatus 200 can be obtained for adjusting the display direction by directly looking up the parameters corresponding to the data generated by the first sensor 212 and the second sensor 214 via a look-up table. In the other method, the display direction of the electronic apparatus 200 can be adjusted according to the force applied to the electronic apparatus 200 in an initial placement status corresponding to the data generated by the first sensor 212 and the second sensor 214.

Referring to FIG. 7, a look-up table of the electronic apparatus 200 is shown. The look-up table is set up in the system controller 226 of the electronic apparatus 200 in FIG. 2. Under different placement statuses of the electronic apparatus 200, the system controller 226 compares the data generated by the first sensor 212 and the second sensor 214 with the parameters of the look-up table to obtain the placement status of the electronic apparatus 200, and then output the driving signal S12 for adjusting the display direction of the electronic apparatus 200. The data X1 and Y1 corresponding to the first landscape status, the data X2 and Y2 corresponding to the first portrait status, the data X3 and Y3 corresponding to the second landscape status, and the data X4 and Y4 corresponding to the second portrait status can be used as the parameters of the look-up table. Taking a 10-bit analog to digital converter as an example, when the electronic apparatus 200 is in the first landscape status, the first group of parameters (X1, Y1) can be obtained with the value X1 close to 121 and the value Y1 between 121 and 184. When the electronic apparatus 200 is in the first portrait status, the second group of parameters (X2, Y2) can be obtained with the value X2 between 58 and 121 and the value Y2 close to 121. When the electronic apparatus 200 is in a second landscape status, the third group of parameters (X3, Y3) can be obtained with the value X3 close to 121 and the value Y3 between 58 and 121. When the electronic apparatus 200 is in a second portrait status, the forth group of parameters (X4, Y4) can be obtained with the value X4 between 121 and 184 and the value Y3 close to 121.

By observing the parameters in the look-up table, it can be found that the four groups of parameters corresponding to the four different placement statuses of the electronic apparatus 200, have their corresponding specific ranges. By using the separability feature of the above-mentioned parameters, when the electronic apparatus 200 is to determine the display direction of the display unit 230, the processing unit 220 can find out which parameter range of placement status the data generated by the first sensor 212 and the second sensor 214 lie in via the look-up table, and determine the display direction of the electronic apparatus 200 according to the parameter range. For example, the electronic apparatus 200 is placed in a to-be-tested placement status, and the data X and Y detected by the first sensor 212 and the second sensor 214 of the sensing unit 210 are respectively 121 and 160. The electronic apparatus 200 determines that the group of parameters lies in the parameter range corresponding to the first landscape status, and the processing unit 220 adjusts the display direction of the electronic apparatus 200 according to the first landscape status.

In terms of the second determination method, the electronic apparatus 200 can determine a relationship table according to the parameter relationship of an initial first status and a second status altered from the first status or the relationship of the data corresponding to the first landscape status, the first portrait status, the second landscape status, and the second portrait status. The relationship table can be set up in the system controller 226 of the electronic apparatus 200 in FIG. 2. For example, two relation equations can be determined according to the parameters of the look-up table in FIG. 7. The first equation is X4>X3=X1>X2, and the second equation is Y1>Y2=Y4>Y3. When the electronic apparatus 200 is set in an initial state, the display direction of the electronic apparatus 200 in the initial state can be determined by the processing unit 220 according to the parameter of the look-up table corresponding to the placement status of the electronic apparatus 200. When the electronic apparatus 200 is changed to other placement status, the processing unit 220 inquires the relationship between the statuses of the electronic apparatus 200 before and after the placement change via the relationship table to determine the display direction of the electronic apparatus 200. For example, the system controller 226 compares the data (the first signal S11) generated by the first sensor 212 and the second sensor 214 with the parameters of the relationship table to determine the placement status of the electronic apparatus 200, and then outputs the driving signal S12 to adjust the display direction of the electronic apparatus 200.

For example, supposed that under the first status of the electronic apparatus 200 before the placement-status change, the data X and Y sensed by the sensors 212 and 214 are respectively 121 and 160, the processing unit 220 can determine the first status to be a first landscape status via the look-up table and determine the display direction according to the first landscape status. When the electronic apparatus 200 is changed to the second status, the electronic apparatus 200 uses the first sensor 212 and the second sensor 214 to obtain the value X equal to 85 and the value Y equal to 121, wherein X<X1 and Y<Y1. The processing unit 220 determines only the first portrait status satisfies the relation via the relationship table, thus determines the second status to be the first portrait status, and adjusts the display direction of the electronic apparatus 200 according to the first portrait status.

Embodiment Two

Figure 8:
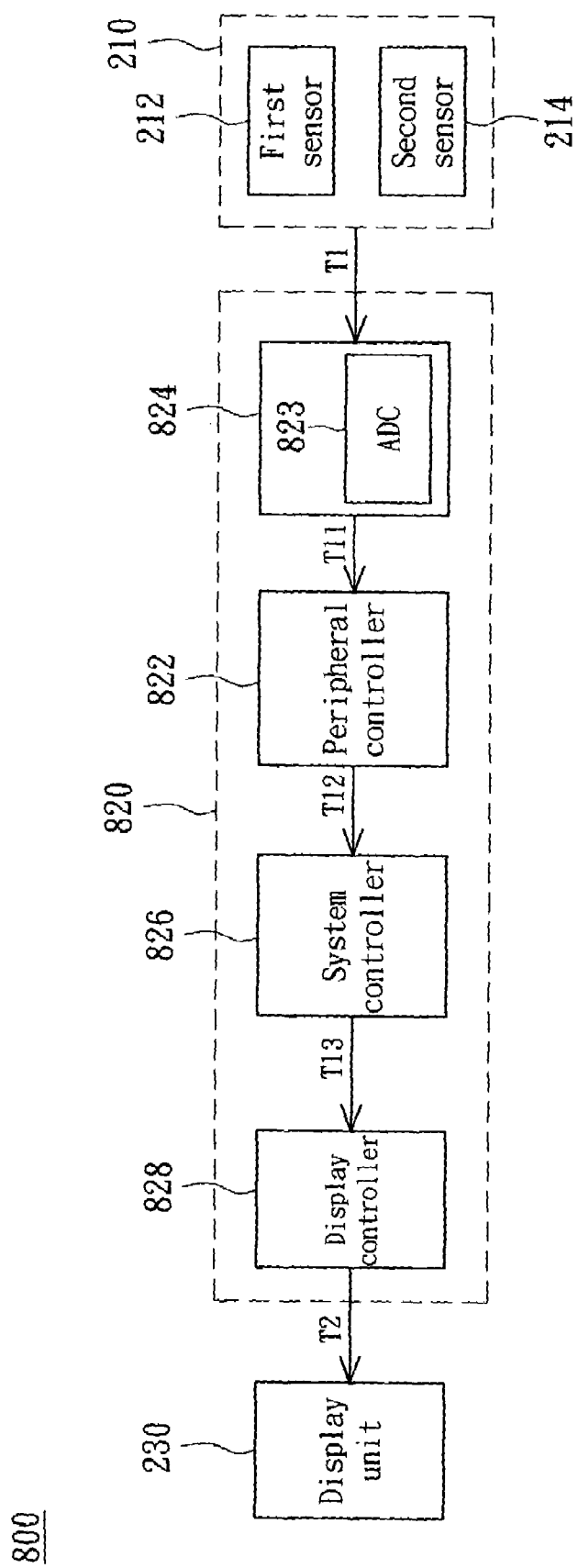
FIG. 8 is a block diagram of another electronic apparatus capable of adjusting display direction according to the second embodiment of the invention.

Referring to FIG. 8, a block diagram of another electronic apparatus capable of adjusting display direction according to the second embodiment of the invention is shown. As compared to the processing unit 220 of the first embodiment, the processing unit 820 in the embodiment includes an additional micro-controller 824 having an analog to digital converter 823 for reducing the loading of the peripheral controller. The electronic apparatus 800 includes a sensing unit 210, a processing unit 820, and a display unit 230. The processing unit 210 outputs a sensing signal T1 according to the placement status of the electronic apparatus 800. The processing unit 820 includes a micro-controller 824, a peripheral controller 822, a system controller 826 and a display controller 828. The micro-controller 824 includes an analog to digital converter 823 for converting the sensing signal T1 into a digital signal. The micro-controller 824 outputs a second signal T11 according to the digital signal. The peripheral controller 822 outputs a third signal T12 according to the second signal T11, and the system controller outputs a driving signal T13 according to the third signal T12 by inquiring a look-up table or a predetermined relationship table. The display controller 828 outputs a control signal T2 to control the display direction of the display unit 230 according to the driving signal T13.

Figure 9:
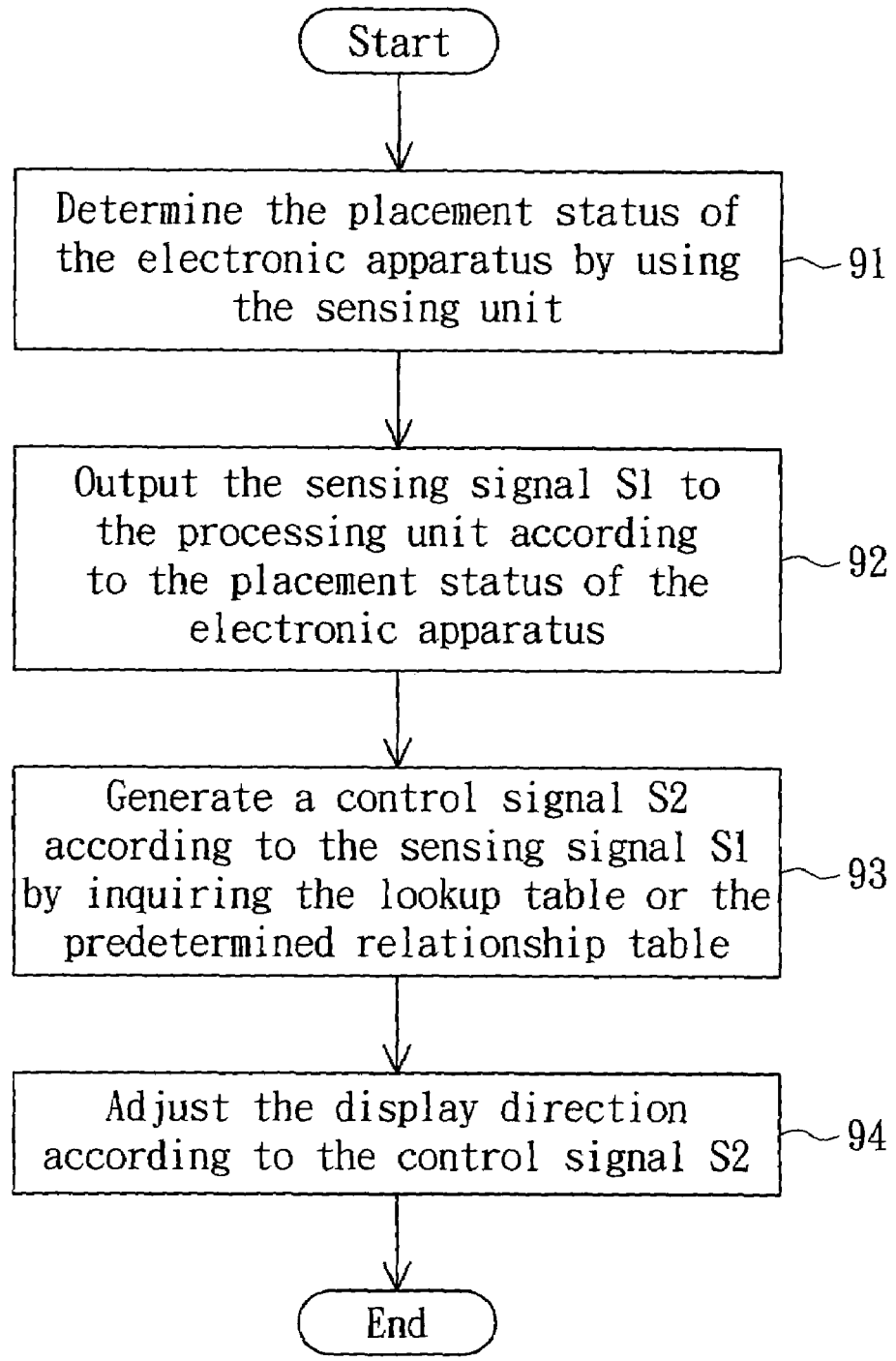
FIG. 9 is a flow chart of the display-direction adjusting method according to a preferred embodiment of the invention.

Referring to FIG. 9, a flow chart of the display-direction adjusting method according to a preferred embodiment of the invention is shown. The display-direction adjusting method can be applied to both the first embodiment and the second embodiment. The display-direction adjusting method is applied to an electronic apparatus including a sensing unit, a processing unit, and a display unit. The method includes the following steps. First, in step 91, determine the placement status of the electronic apparatus by using the sensing unit. Following that, in step 92, the sensing unit outputs the sensing signal S1 to the processing unit according to the placement status of the electronic apparatus. Next, in step 93, the processing unit generates a control signal S2 according to the sensing signal S1 by inquiring the look-up table or the predetermined relationship table. Finally, in step 94, the display unit adjusts the display direction according to the control signal S2.

The electronic apparatus capable of adjusting display direction and the display-direction adjusting method thereof disclosed by the above-mentioned embodiments of the invention have the following advantage: no matter which placement status the electronic apparatus is situated in, the electronic apparatus can adjust its display direction according to the placement status. Therefore, the user can see the correct image frame of the electronic apparatus without changing his/her observation position.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus capable of adjusting display direction, comprising:
    a sensing unit, for outputting a sensing signal according to the orientation of the electronic apparatus, the orientation being one of a plurality of different possible orientations, including at least a first orientation and a second orientation;
    a processing unit, for generating a control signal according to the sensing signal;
    a display unit, for adjusting display direction under the control of the control signal; and
    a look-up table, wherein
        the look-up table includes a plurality of parameters, the parameters respectively corresponding to the different possible orientations of the electronic apparatus, and
        when the electronic apparatus is in an initial state, the processing unit determines the display direction of the electronic apparatus in the initial state according to the parameter among the plurality of parameters that corresponds to the first orientation of the electronic apparatus;
    wherein when the orientation of the electronic apparatus changes from the first orientation to a second orientation, the processing unit determines the display direction of the electronic apparatus according to the relationship between first data indicating the sensing signal corresponding to the first orientation of the electronic apparatus and second data indicating the sensing signal corresponding to the second orientation of the electronic apparatus after the change in orientation.

2. The electronic apparatus according to claim 1, wherein the sensing unit is an accelerometer.

3. The electronic apparatus according to claim 2, wherein the sensing unit comprises:
    a first sensor, for sensing magnitude of a first force applied to the electronic apparatus in a first direction; and
    a second sensor, for sensing magnitude of a second force applied to the electronic apparatus in a second direction;
    wherein the first direction is perpendicular to the second direction;
    wherein the accelerometer outputs the sensing signal according to the magnitude of the first force and the second force.

4. The electronic apparatus according to claim 1, wherein the processing unit comprises:
    a peripheral controller, for outputting a first signal according to the sensing signal;
    a system controller, for outputting a driving signal according to the first signal; and
    a display controller, for outputting the control signal to control the display direction of the display unit according to the driving signal.

5. The electronic apparatus according to claim 4, wherein the peripheral controller comprises an analog-to-digital converter (ADC).

6. The electronic apparatus according to claim 1, wherein the processing unit comprises:
    a micro-controller, for outputting a second signal according to the sensing signal;
    a peripheral controller, for outputting a third signal according to the second signal;
    a system controller, for outputting a driving signal according to the third signal; and
    a display controller, for outputting a control signal to control the display direction of the display unit according to the driving signal.

7. The electronic apparatus according to claim 6, wherein the micro-controller comprises an analog-to-digital converter.

8. An electronic apparatus capable of adjusting display direction, comprising:
    a sensing unit, for outputting a sensing signal according to an orientation of the electronic apparatus, the orientation being among a plurality of possible orientations;
    a processing unit, for generating a control signal according to the sensing signal;
    a display unit, for adjusting display direction under the control of the control signal; and
    a look-up table and a relationship table, wherein the look-up table has a plurality of parameters, when the electronic apparatus is in an initial state, the processing unit determines the display direction of the electronic apparatus in the initial state according to a parameter among the plurality of parameters corresponding to the orientation of the electronic apparatus;
    wherein when the orientation of the electronic apparatus changes, the processing unit determines the display direction of the electronic apparatus by looking up in the relationship table, the relationship between a first orientation among the plurality of possible orientations of the electronic apparatus before the change in orientation and a second orientation among the plurality of possible orientations of the electronic apparatus after the change in orientation, according to a comparison between first data indicating the sensing signal corresponding to the first orientation and second data indicating the sensing signal corresponding to the second orientation.

9. The electronic apparatus according to claim 8, wherein the sensing unit is an accelerometer.

10. The electronic apparatus according to claim 8, wherein the sensing unit comprises:
   a first sensor, for sensing magnitude of a first force applied to the electronic apparatus in a first direction; and
   a second sensor, for sensing magnitude of a second force applied to the electronic apparatus in a second direction perpendicular to the first direction,
   wherein the accelerometer outputs the sensing signal according to the magnitude of the first force and the magnitude of the second force.

11. The electronic apparatus according to claim 8, wherein the processing unit comprises:
   a peripheral controller, for outputting a first signal according to the sensing signal;
   a system controller, for outputting a driving signal according to the first signal; and
   a display controller, for outputting the control signal to control the display direction of the display unit according to the driving signal.

12. The electronic apparatus according to claim 11, wherein the peripheral controller comprises an analog-to-digital converter (ADC).

13. The electronic apparatus according to claim 8, wherein the processing unit comprises:
   a micro-controller, for outputting a second signal according to the sensing signal;
   a peripheral controller, for outputting a third signal according to the second signal;
   a system controller, for outputting a driving signal according to the third signal; and
   a display controller, for outputting a control signal to control the display direction of the display unit according to the driving signal.

14. The electronic apparatus according to claim 13, wherein the micro-controller comprises an analog-to-digital converter.

15. A display-direction adjusting method, applied to an electronic apparatus, the electronic apparatus comprising a sensing unit, a processing unit and a display unit, the display-direction adjusting method comprising:
   determining the orientation of the electronic apparatus by the sensing unit;
   outputting a sensing signal to the processing unit according to the orientation of the electronic apparatus by the sensing unit;
   generating a control signal according to the sensing signal by the processing unit; and
   adjusting the display direction of the display unit according to the control signal;
   wherein the electronic apparatus comprises a look-up table, the look-up table including a plurality of parameters, the parameters respectively corresponding to different possible orientations of the electronic apparatus, including a first orientation and a second orientation,
   wherein when the electronic apparatus is in an initial state, the processing unit determines the display direction of the electronic apparatus in the initial state according to the parameter among the plurality of parameters that corresponds to the first orientation;
   wherein when the orientation of the electronic apparatus changes from the first orientation to a second orientation, the processing unit determines the display direction of the electronic apparatus according to the relationship between first data indicating the sensing signal corresponding to the first orientation of the electronic apparatus and second data indicating the sensing signal corresponding to the second orientation of the electronic apparatus after the change in orientation.

16. The display-direction adjusting method according to claim 15, wherein the step of determining the orientation of the electronic apparatus by the sensing unit comprises using an accelerometer to determine the orientation of the electronic apparatus.

17. The display-direction adjusting method according to claim 16, wherein the step of using an accelerometer to determine the orientation of the electronic apparatus comprises:
   using a first sensor to sense magnitude of a first force applied to the electronic apparatus in a first direction; and
   using a second sensor to sense magnitude of a second force applied to the electronic apparatus in a second direction, perpendicular to the second direction
   wherein the accelerometer outputs the sensing signal according to the magnitude of the first force and the magnitude of the second force.

18. The display-direction adjusting method according to claim 15, wherein the step of generating the control signal according to the sensing signal by the processing unit comprises:
   using a peripheral controller of the processing unit to output a first signal according to the sensing signal;
   using a system controller of the processing unit to output a driving signal according to the first signal; and
   using a display controller of the processing unit to output a control signal to control the display direction of the display unit according to the driving signal.

19. The display-direction adjusting method according to claim 18, wherein the step of using the peripheral controller to output the first signal comprises using an analog-to-digital converter.

20. The display-direction adjusting method according to claim 15, wherein the step of generating the control signal according the sensing signal by the processing unit comprises:
   using a micro-controller of the processing unit to output a second signal according to the sensing signal;
   using a peripheral controller of the processing unit to output a third signal according to the second signal;
   using a system controller of the processing unit to output a driving signal according to the third signal; and
   using a display controller of the processing unit to output a control signal to control the display direction of the display unit according to the driving signal.

21. The display-direction adjusting method according to claim 20, wherein the step of using the micro-controller to output the second signal comprises using an analog-to-digital converter.

22. A display-direction adjusting method, applied to an electronic apparatus, the electronic apparatus comprising a sensing unit, a processing unit and a display unit, the display-direction adjusting method comprising:
   determining the orientation of the electronic apparatus determined by the sensing unit;
   outputting a sensing signal to the processing unit according to the orientation of the electronic apparatus by the sensing unit;

generating a control signal according to the sensing signal by the processing unit; and adjusting the display direction of the display unit according to the control signal;

wherein the electronic apparatus has a look-up table and a relationship table;

wherein the look-up table has a plurality of parameters, when the electronic apparatus is in an initial state, the processing unit determines the display direction of the electronic apparatus in the initial state according to a parameter, among the plurality of parameters, that corresponds to the orientation of the electronic apparatus; and wherein when the orientation of the electronic apparatus changes, the processing unit determines the display direction of the electronic apparatus by looking up in the relationship table the relationship between a first orientation of the electronic apparatus before the change in orientation and a second orientation of the electronic apparatus after the change in orientation, according to a comparison between first data indicating the sensing signal corresponding to the first orientation and second data indicating the sensing signal corresponding to the second orientation.

23. An electronic apparatus capable of adjusting display direction, comprising:

a sensing unit, for outputting a sensing signal according to the orientation of the electronic apparatus;

a processing unit, for generating a control signal according to the sensing signal, wherein the processing unit sets up a look-up table according to data indicating the sensing signal outputted according to each of a plurality of orientations of the electronic apparatus; and a display unit, for adjusting display direction under the control of the control signal;

wherein the processing unit determines the display direction of the electronic apparatus according to the look-up table and data indicating the sensing signal outputted according to a first orientation of the electronic apparatus.

24. The electronic apparatus according to claim 23, wherein when the orientation of the electronic apparatus changes from the first orientation to a second orientation, the processing unit determines the display direction of the electronic apparatus according to the relationship between first data indicating the sensing signal outputted according to the first orientation of the electronic apparatus and second data indicating the sensing signal outputted according to the second orientation of the electronic apparatus after the change in orientation.

25. The electronic apparatus according to claim 24, wherein when the orientation of the electronic apparatus changes from the first orientation to a second orientation, the processing unit compares first data indicating the sensing signal outputted according to the first orientation of the electronic apparatus with second data indicating the sensing signal outputted according to the second orientation of the electronic apparatus after the change in orientation according to the relationship among the parameters of the look-up table, so as to determine the display direction of the electronic apparatus.

26. The electronic apparatus according to claim 23, wherein the processing unit further sets up a relationship table according to the relationship among the parameters of the look-up table to indicate the relationship among the corresponding orientations of the electronic apparatus.

27. The electronic apparatus according to claim 26, wherein when the electronic apparatus changes the orientation of the electronic apparatus from the first orientation to a second orientation, the processing unit looks up in the relationship table the relationship between first data indicating the sensing signal outputted according to the first orientation of the electronic apparatus and second data indicating the sensing signal outputted according to the second orientation of the electronic apparatus after the change in orientation, so as to determine the display direction of the electronic apparatus.

* * * * *